April 25, 1961
C. P. SALMON ET AL
2,981,475
VALVE
Filed June 7, 1956
2 Sheets-Sheet 1
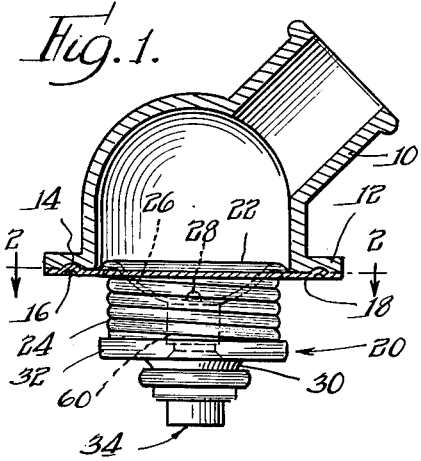
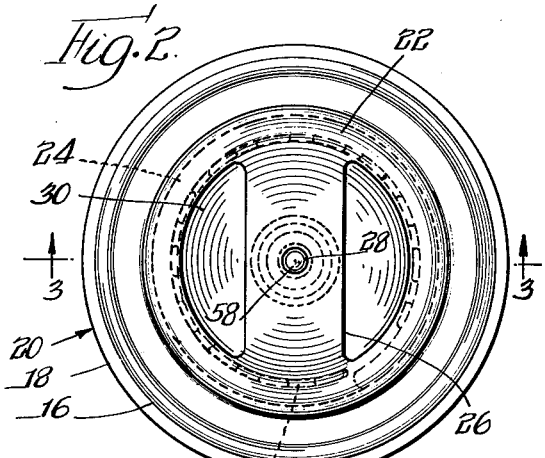
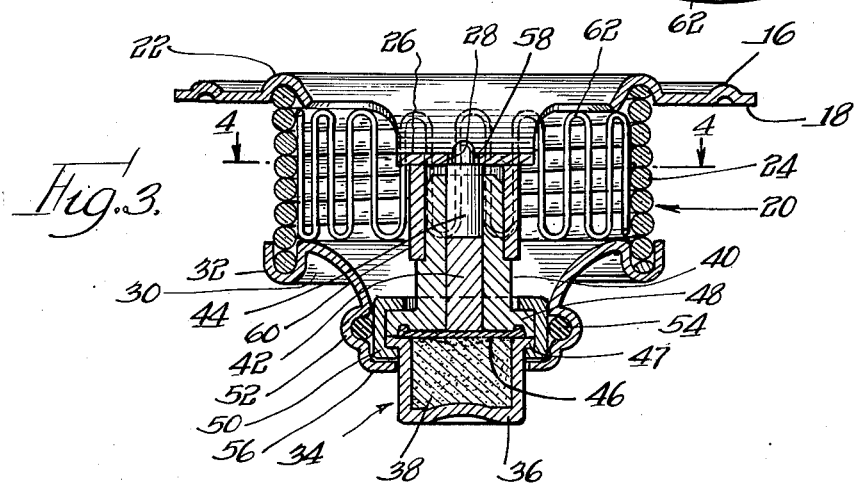
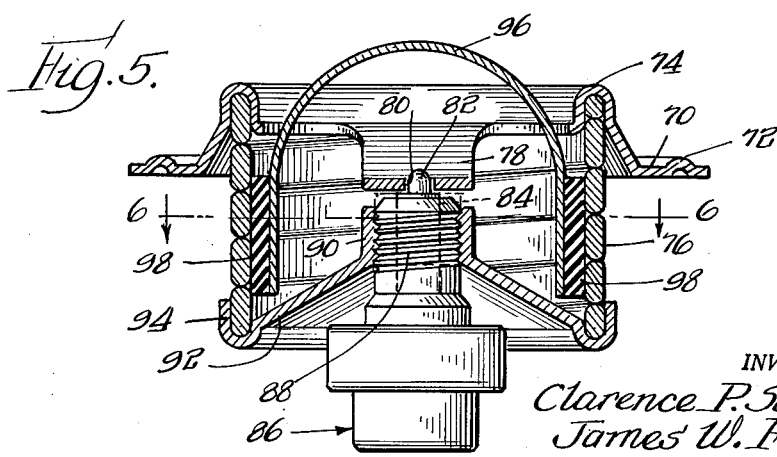
INVENTORS
Clarence P. Salmon
James W. Farmer
By: Olson & Trexler
attys April 25, 1961    C. P. SALMON ET AL    2,981,475
VALVE Filed June 7, 1956    2 Sheets-Sheet 2

INVENTORS
Clarence P. Salmon
James W. Farmer
By: Olson & Trexler attys.

United States Patent Office 2,981,475
Patented Apr. 25, 1961

2,981,475
VALVE

Clarence P. Salmon and James W. Farmer, Elgin, Ill., assignors to Flexonics Corporation, Maywood, Ill., a corporation of Illinois Filed June 7, 1956, Ser. No. 589,925

5 Claims. (Cl. 236—34)

This invention relates to a valve and specifically to a thermostatically controlled valve suitable for use in the cooling system of an automobile engine.

In the valve of the present invention, the valve member proper takes the form of a coiled spring. A temperature responsive element serves to spread apart the spring convolutions to permit fluid flow therebetween.

We have found that a valve of the type indicated in the preceding paragraph is subject to severe vibration in the first stages of a valve opening movement, as evidenced by the fact that after a valve opening movement has been initiated the rate of fluid flow through the valve is reduced rather than increased when fluid pressure is raised. This condition prevails through a considerable period of the valve opening movement. Further, in part of this period of the valve opening movement, the vibration of the valve is of the harmonic type, and gives rise to strong sonic vibrations which sometimes cause destruction of parts of the valve.

It is therefore an important object of the present invention to provide a valve having a valve member proper in the form of a coiled spring, which valve is operable at any time without objectionable vibrations.

Another object of the present invention is to provide a thermostatically controlled valve suitable for use in the cooling system of an internal combustion engine and characterized by absence of leakage therethrough when in closed position coupled with high rate of flow therethrough when the valve is fully open, whereby rapid warm-up of the engine is facilitated together with maximum cooling efficiency for a given size of cooling system.

Another object of the present invention is to provide a thermostatically operated valve of the type indicated in the last preceding paragraph having flow characteristics which are not materially altered by changes in engine speed with resultant changes in pump pressure and/or variations in system pressure.

Other and further objects and features of the present invention will become apparent from the following description and appended claims as illustrated by the accompanying drawings which show, by way of examples, valves according to the present invention, and in which:

Fig. 1 is a partial central vertical cross sectional view, with parts shown in elevation, of a conduit for an automobile engine cooling system incorporating a valve according to the present invention;

Fig. 2 is an enlarged plan view taken along the line 2—2 of Fig. 1 showing the top of the valve incorporated with the conduit of Fig. 1;

Fig. 3 is a cross sectional view taken along the line 3—3 of Fig. 2;

Fig. 5 is a view similar to Fig. 3, with parts shown in elevation, but showing another valve according to the present invention;

Figure 4:
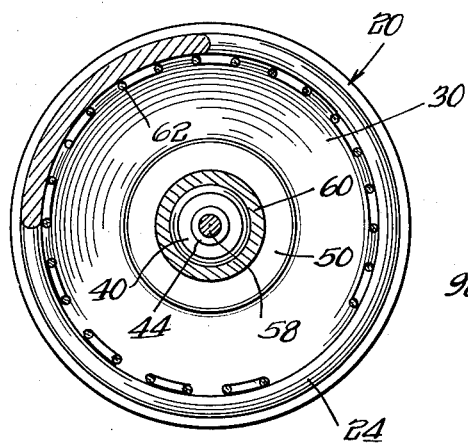
Fig. 4 is a cross sectional view taken along the line 4—4 of Fig. 3.

Referring now to Fig. 1, the numeral 10 designates a conduit leading to the radiator from the water jacket (not shown) of an automobile engine. This conduit 10 is provided with a horizontal flange 12 having a circular groove 14 receiving a circular bead 16 projecting upwardly from a generally flat annular sheet metal member 18 forming the uppermost part of a valve indicated generally in Figs. 1 through 4 by the reference numeral 20. The groove 14 and bead 16 serve to locate the valve 20 with respect to the conduit 10. The valve 20 may be held in place by clamping the annulus 18 between the flange 12 and the wall of the above mentioned water jacket around an aperture (not shown) in said water jacket.

The annulus 18 of the valve 20 has its inner margin formed as a second upwardly projecting circular bead 22 immediately inside the flange 12 of conduit 10 which defines, on the lower face of the annulus 18, a seat for the upper end of a coiled spring 24. The uppermost convolution of the spring 24 is attached to the inside of the bead 22 by any suitable methods, as by soldering or spot welding. An arcuately depressed strap 26 having a central aperture 28 extends diametrically across the valve outlet opening defined by the bead 22.

The valve 20 further includes a generally funnel-shaped sheet metal member 30 having its outer margin formed into a deep depending bead 32 forming a clamping seat for the lower end of the coil spring 24. The inner margin of the funnel-shaped member 30 serves, in a manner described hereinbelow, to hold a temperature responsive pellet type thermostat generally indicated at 34. As best shown in Fig. 3, the thermostat 34 is constructed as disclosed in the United States patent to Vernet No. 2,368,181, including a lower cup-shaped container 36 holding a plastic thermally expanding material 38 (of a composition such as that disclosed in the United States patent to Vernet No. 2,259,846), an upper tubular element 40, a plastic plug 42 in the bottom part of the bore of the tubular element 40, a piston 44 in the top part of the bore of the tubular element 40, and a diaphragm 46 separating the thermally expanding material 38 from the plastic plug 42. Further, the container 36 is formed with an upper flange 47 and the tubular element 40 with a lower flange 48 between which the margin of diaphragm 46 is clamped, the two flanges 47 and 48 being held together by a ring 50 of U-shaped cross sectional configuration. As disclosed in said patent to Vernet No. 2,368,181, a thermostat of such construction requires external pressure to compress the thermostat to its original condition after it has been expanded, since it has an inherent resistance to contraction in volume on temperature decrease. As also shown in Fig. 3, the inner margin of the funnel-shaped member 30 is formed with a bead 52 accommodating an O-ring 54 abutting against the ring 50 of the thermostat 34. Further, the inner rim of the funnel-shaped member 30 is bent over inwardly, as indicated at 56, to underlie the bottom of the ring 50 of the thermostat 34. Thus, the thermostat 34 is firmly and tightly held in the central aperture of the funnel-shaped member 30, and the member 30 and the thermostat 34 together form a closure for the lower end of the coil spring 24 against fluid flow into this end of the coil spring.

At its upper end, the piston 44 of the thermostat 34 is formed with a constricted end portion or finger 58 which has a sliding fit in the central aperture 28 of the strap 26. The terminal piston shoulder defined around the lower end of the finger 58 abuts against the strap 26. A skirt 60 depending from the strap 26 surrounds the tubular element 40 of the thermostat 34 to form a guide for locating and holding the thermostat.

A spring 62 extends arcuately inside the coil spring 24 in contact therewith. The spring 62 consists of a wire bent into sinusoidal shape in a single plane and thereafter compressed arcuately to fit inside the coil spring 24, where the compression of the spring 62 tends to straighten out the spring so that the spring will exert pressure against the inside of the coil spring 24.

Preferably, the coil spring 24 is so made that its convolutions, in the absence of any axially directed pressure, are slightly open. However, a pressure of five pounds or more in the axial direction will compress the coil spring 24 completely so that the convolutions thereof contact each other to close the valve. This feature is of great importance in facilitating the filling of the water jacket of an automobile engine with water for the first time. The water jacket can be filled rapidly, for the air is not trapped but can readily escape between the convolutions of the coil spring 24. On the other hand, as soon as the circulating pump has been started, the valve is closed tightly.

The above described valve functions as follows. Ordinarily, the pressure of the circulating pump acting against the funnel-shaped member 30 and the thermostat 34 holds the coil spring 24 compressed, so that no water will flow through the valve. When the water temperature rises, the thermally expanding material 38 pushes upwardly against the plug 42 and thereby also against the piston 44. The annulus 18 and its strap 26 being fixed, and the terminal shoulder of the piston 44 abutting against the margins around the aperture 28 in the strap 26, no upward movement of the piston 44 with respect to the strap 26 is possible, and therefore the thermostat 34 will move downwardly, carrying with it the funnel-shaped member 30, so that the convolutions of the spring 24 will be spread apart, permitting flow of water between the convolutions into the interior of the coil spring 24 and thence upwardly through the aperture defined by the bead 22 of the annulus 18. Due to the action of the spring 62, no vibrations will be set up in the valve, and flow of water will take place which is more or less proportional to the area of the openings provided between the convolutions of the spring 24.

Further, while a helically wound coil spring is shown made of wire of round cross sectional form, other types of coil springs may be used, for instance, coils of spiral shape. The convolutions of the coil spring may be circular, elliptical, square, triangular or of other shape. The wire may be of rectangular, circular, elliptical or other cross sectional shape. The coil spring may be made in such fashion as to have little or no resiliency, which may then be supplied by an auxiliary spring (not shown) reacting, for instance, between the strap 26 and the ring 50 of the thermostat 34.

Figure 6:
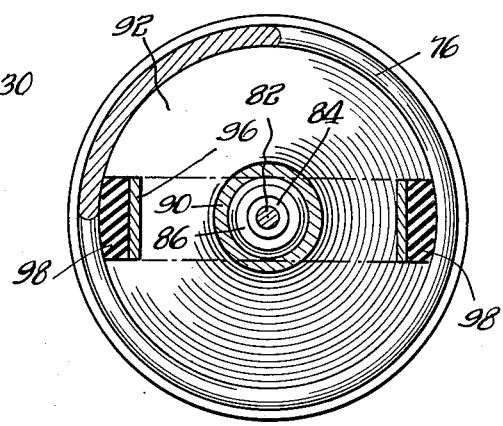
Fig. 6 is a cross sectional view taken along the line 6—6 of Fig. 5.

Referring now to Figs. 5 and 6, another valve according to the present invention is shown as including an annular sheet metal member 70 having an upwardly projecting circular bead 72 around its outer margin which serves, similarly to the outer margin of the annulus 18 of the valve of Figs. 1 through 4, to locate the valve of Figs. 5 and 6 with respect to the water conduit and the water jacket of an automobile engine. The inner margin of the annular sheet member 70 projects upwardly and has its rim bent over downwardly, as indicated at 74, to form a clamping seat for the uppermost convolution of a coil spring 76 made up of wire having a generally rectangular cross sectional shape. A strap 78 extends diametrically across the outlet aperture defined by the inner edge of the annulus 70. This strap is formed with a central aperture 80 receiving the restricted end portion 82 of a piston 84 forming part of a thermostat generally indicated at 86 of identical construction with the thermostat 34 of Fig. 3. The upper part of this thermostat 86 is externally threaded, as indicated at 88, to receive the internally threaded central tubular portion 90 of a generally funnel-shaped member 92 having its outer margin formed into a bead 94 clampingly receiving the lowermost convolution of the coil spring 76. A leaf spring 96 compressed into U-shape and having pieces 98 of silicone rubber attached to its ends project into the coil spring 76, with the pieces of silicone rubber contacting the inside of the coil spring 76 at diametrically opposite areas.

The valve of Figs. 5 and 6 functions similarly to the valve of Figs. 1 through 4.

Figure 7:
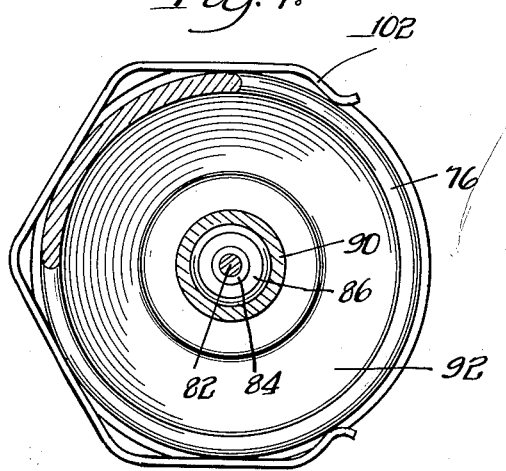
Fig. 7 is a view similar to Fig. 6 but showing still another valve according to this invention.
Figure 8:
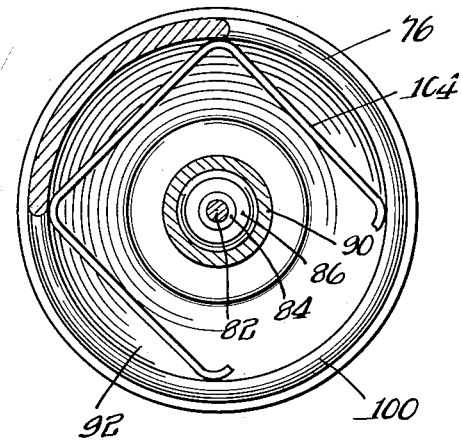
Fig. 8 is a view similar to Fig. 6 but showing still another valve according to this invention.

Figs. 7 and 8 illustrate valves similar to that of Figs. 5 and 6, except for the fact that the vibration dampening springs are of different construction. In each of the valves of Figs. 7 and 8 elements identical with corresponding elements in the valve of Figs. 5 and 6 are indicated with the same numerals. In the valve of Fig. 7, a dampening spring 102 takes the form of a horse shoe which has been forced open to fit over the outside of the spring 100 and presses against the outside of the spring 100. In the valve of Fig. 8, a spring 104 tends to expand against the inside of the coil spring 100. The valves of Figs. 7 and 8 function similarly to the valves described hereinabove.

As shown, the dampening springs of the valves of the present invention may be disposed inside or outside the coil spring forming the valve member proper of the valves of the present invention. The precise form of these dampening springs is not critical, as long as the springs contact the coil spring in at least one and preferably in at least two spaced areas to exert a pressure thereagainst. Many other details may be varied without departing from the principles of this invention, and it is therefore not our purpose to limit the patent granted on this application otherwise necessitated by the scope of the appended claims.

The invention is claimed as follows:

1. A valve comprising a one-piece solid wire in the form of a coiled spring arranged in cylindrical form with contiguous convolutions contacting one another to close the valve but separable to permit fluid flow therebetween, an annular member having an annular channel in which one end convolution of the coiled spring is secured and said annular member being apertured interiorly of said channel to permit flow of fluid to the interior of the coiled spring, a closure member of generally annular form having an annular channel facing the first-mentioned channel and in which the opposite end convolution of the coiled spring is mounted, said closure member having a central annular wall portion, one of said members being fixed and the other of said members being movable with respect to said fixed member, a temperature responsive mechanism carried by said wall portion with the opposite end thereof in operative association with said annular member and operable upon expansion thereof to relatively shift apart said annular and said closure member to separate the spring convolutions and permit the passage of fluid therebetween, and spring means bearing against the coiled spring at peripherally spaced areas and along a longitudinal extent thereof sufficient to engage substantially all of the spring convolutions between the channels in said annular member and said closure member for dampening vibrations in the valve during operation thereof.

2. A valve as claimed in claim 1, wherein the spring means comprises a sinusoidal spring engaging the coiled spring at a multiplicity of peripherally spaced areas substantially throughout the longitudinal extent of said coiled spring between said annular member and said closure member.

3. A valve as claimed in claim 1, wherein the spring means comprises a contraction spring disposed around the outside of said coiled spring.

4. A valve as claimed in claim 1, wherein the spring means comprises an expansion spring disposed inside of said coiled spring.

5. A valve as claimed in claim 1, wherein said annular member includes a transverse central strap portion providing fluid flow apertures on opposite sides thereof, and wherein the spring means comprises a U-shaped leaf spring bearing interiorly on the coiled spring and extending through said apertures and straddling the said strap member.

References Cited in the file of this patent

UNITED STATES PATENTS

| | | |
|---|---|---|
| 960,080 | Fay et al. | May 31, 1910 |
| 1,246,355 | Thomas | Nov. 13, 1917 |
| 1,916,814 | Shivers | July 4, 1933 |
| 1,928,678 | Sjolander | Oct. 3, 1933 |
| 2,040,435 | Griswald | May 12, 1936 |
| 2,136,908 | Pierce | Nov. 15, 1938 |
| 2,265,586 | Vernet | Dec. 9, 1941 |
| 2,479,034 | Bolesky | Aug. 16, 1949 |
| 2,578,958 | Winters | Dec. 18, 1951 |
| 2,768,633 | Mayo | Mar. 26, 1956 |
| 2,777,638 | Wood | Jan. 15, 1957 |
| 2,842,318 | Campbell | July 8, 1958 |